(12) United States Patent
Petersen

(10) Patent No.: US 12,079,637 B1
(45) Date of Patent: Sep. 3, 2024

(54) DATA MANAGEMENT USING REACTIVE CODE EXECUTION

(71) Applicant: Ethernovia Inc., San Jose, CA (US)

(72) Inventor: Brian Arnold Petersen, San Francisco, CA (US)

(73) Assignee: Ethernovia Inc., San Jose, CA (US)

( * ) Notice: Subject to any disclaimer, the term of this patent is extended or adjusted under 35 U.S.C. 154(b) by 68 days.

(21) Appl. No.: 18/069,548

(22) Filed: Dec. 21, 2022

Related U.S. Application Data

(60) Provisional application No. 63/265,798, filed on Dec. 21, 2021.

(51) Int. Cl.
*G06F 9/44* (2018.01)
*G06F 9/445* (2018.01)

(52) U.S. Cl.
CPC ............................. *G06F 9/44505* (2013.01)

(58) Field of Classification Search
CPC ...................................... G06F 1/32; G06F 9/44
See application file for complete search history.

(56) References Cited

U.S. PATENT DOCUMENTS

2005/0149634 A1* 7/2005 McKenney ............... G06F 9/52
709/248
2017/0116017 A1* 4/2017 Rose .................. G06F 9/45558

* cited by examiner

*Primary Examiner* — Keshab R Pandey
(74) *Attorney, Agent, or Firm* — Schwegman Lundberg & Woessner, P.A.

(57) ABSTRACT

Various embodiments described herein support or provide for reactive code execution, such as receiving a byte string that includes a data structure; determining that processing the byte string requires a routine that is handled by a processor capable of operating in a proactive mode or a reactive mode; determining that the value corresponds to a type of value; executing, by the processor operating in the reactive mode, an instruction that causes the processor to remain in the reactive mode of operation; and processing the element by the processor operating in the reactive mode.

20 Claims, 8 Drawing Sheets

DATA MANAGEMENT USING REACTIVE CODE EXECUTION

PRIORITY APPLICATION

This application claims priority to U.S. Provisional Patent Application Ser. No. 63/265,798, filed on Dec. 21, 2021, the disclosure of which is incorporated by reference herein in its entirety.

TECHNICAL FIELD

The present disclosure generally relates to data management and, more particularly, various embodiments described herein provide for systems, methods, techniques, instruction sequences, and devices that facilitate reactive code execution.

BACKGROUND

Data management systems face challenges when it comes to optimizing the performance of microprocessors. Specifically, when handling a data element, for example, a microprocessor spends instructions cycles to determine factors, such as the type of the data element and the memory location in which the data element is to be stored, before processing the data content of the data element for various purposes. Challenges arise when data management systems attempt to reduce or avoid such instruction cycles, especially when handling simple data elements of certain types. Improvements are needed.

BRIEF DESCRIPTION OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some embodiments are illustrated by way of embodiments, and not limitations, in the accompanying figures.

DETAILED DESCRIPTION

Figure 1:
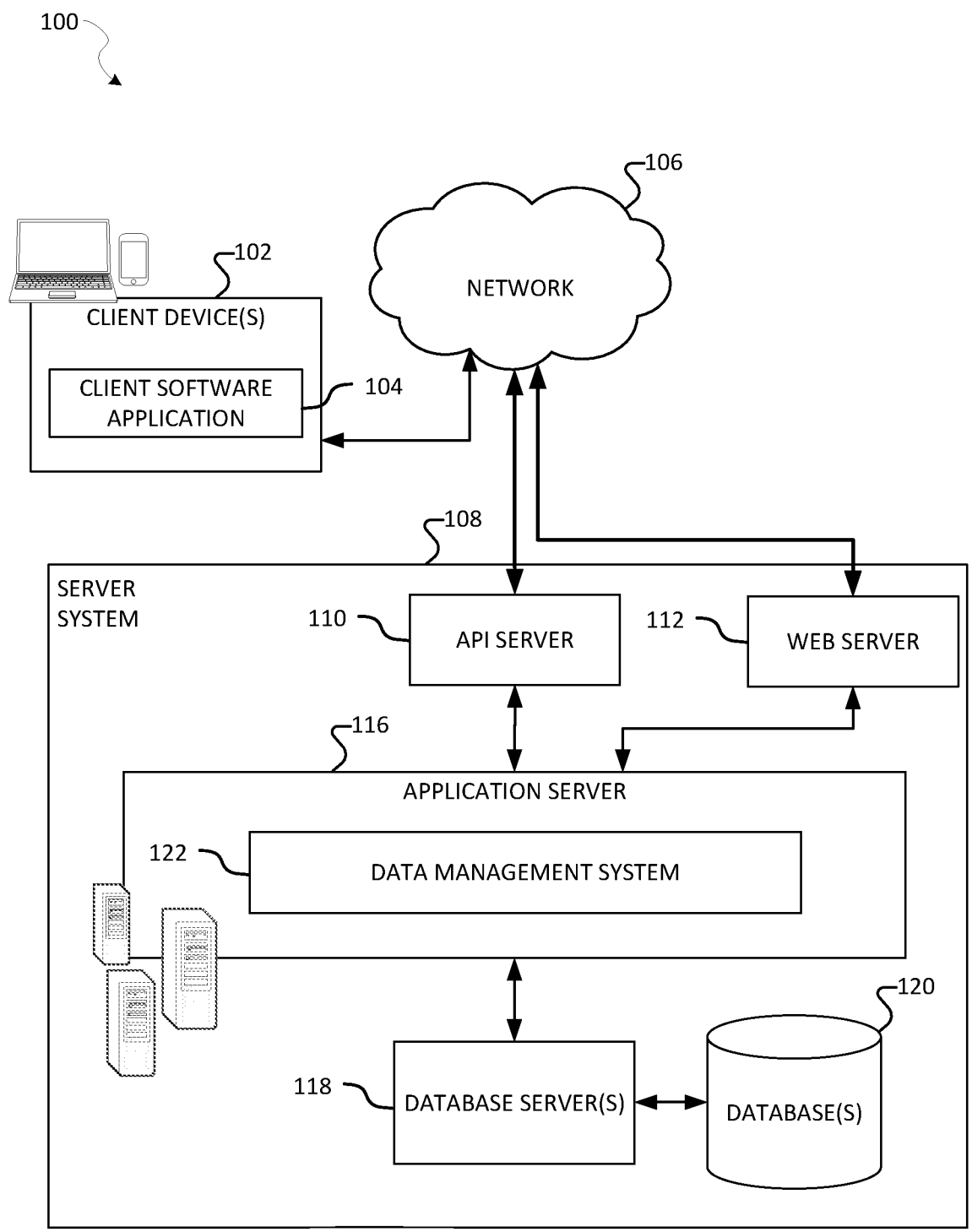
FIG. 1 is a block diagram showing an example data system that includes a data management system, according to various embodiments.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter can be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described can be practiced without the specific details presented herein, or in various combinations, as described herein. Furthermore, well-known features can be omitted or simplified in order not to obscure the described embodiments. Various embodiments may be given throughout this description. These are merely descriptions of specific embodiments. The scope or meaning of the claims is not limited to the embodiments given.

Various embodiments include systems, methods, and non-transitory computer-readable media that facilitate reactive code execution. Specifically, a central processing unit (CPU, also referred to as a processor) can operate in a conventional mode (also referred to as proactive mode) or a reactive mode. The proactive mode can also be referred to as a program-counter-driven mode, where the processor's program counter determines the sequence of instructions to be executed. For example, the program counter can automatically sequence from instruction to instruction and can execute branch instructions that can be used to alter that sequence.

In the reactive mode, in various embodiments, an identifier (e.g., an element identifier) of a data element (e.g., a structured data element) can be used to override a value in the program counter. Under this approach, a processor operating in the reactive mode, based on the element identifier, can fetch one or more instructions directly in order to process the data element. The processing of the data element can include extracting the value of a data element and storing the value in a designated memory location. Meanwhile, the program counter is configured to point to a pointed-to instruction to maintain a state while the processor operates in the reactive mode.

In various embodiments, a processor can operate in the proactive mode at initialization. Specifically, a program counter associated with a processor can determine a sequence of instructions for execution. The proactive mode of operation can be used to manage the transitions between data elements, such as embedded messages, arrays, or other data elements associated with complex data structures. When the program (run by the processor) is ready to accept a data element (e.g., scalars, arrays, embedded structures, and the like), the processor executes the NextVariableId instruction, placing the processor in the reactive mode. In the reactive mode, the data element's identifier value, as opposed to the program counter in proactive mode, is used to choose the next instruction.

In the reactive mode, the program counter can no longer advance automatically. Instead, it is set by the direct interpretation of the data structure element's element identifier value (e.g., variableId). The processor remains in the reactive mode of operation until the element identifier (or the element identifier value) fetches an instruction other than the particular type of instruction (e.g., DeserializeTaggedScalar) that is configured to handle the particular type (e.g., scalars) of data elements.

The processor can automatically revert to proactive operation if the type of a next-to-be-handled data element is anything (e.g., embedded message, array, etc.) other than the particular type of data element (e.g., scalar). The processor remains in the proactive mode until the particular type of instruction (e.g., NextVariableId) is executed.

To optimize performance, the processor, in either the reactive or proactive mode, can execute multiple instructions in parallel. A preprocessing logic (also referred to as a preprocessing unit) is configured to examine a number of consecutive data element identifiers from an incoming byte string and determines if these consecutive data elements can be stored in consecutive locations in a host memory. If so, multiple instructions are fetched and executed in parallel, creating a single wide data word that can be written to the host memory.

In various embodiments, a data management system receives a data structure that includes one or more elements. Each element can include a tag and a value of the element. The data structure can be represented by or included in a received byte string. The data management system determines that processing the byte string (or the data structure) requires a routine or program handled by a processor capable of operating in a proactive and/or reactive mode. Specifically, the processor can operate in one of the two modes at a time.

In various embodiments, a data management system determines, based on the tag (or individual components thereof), that the value corresponds to a particular type of value, such as a scalar type, or equivalent data types associated with simple data structures. The data management system executes, by the processor operating in the reactive mode, an instruction that causes the processor to remain in the reactive mode of operation and process the element by the processor operating in the reactive mode. The instruction that causes the processor to remain in the reactive mode includes an indication of a memory location where the value is to be stored.

In various embodiments, the data management system identifies a further element in the data structure and determines, based on a tag associated with the further element, that the value of the further element corresponds to the particular type of value (e.g., scalar). The data management system processes the further element, including causing the processor to continue operating in the reactive mode to execute the particular type of instruction (e.g., DeserializeTaggedScalar).

In various embodiments, the data management system determines that a next element to be executed by the processor does not correspond to the type of value. Based on the determination, the data management system causes the processor to revert back to the proactive mode of operation.

In various embodiments, the data management system can cause the processor operating in the reactive mode to process a plurality of data elements in parallel based on one or more factors. A first example factor is that the data management system determines that the next plurality of elements to be executed by the processor corresponds to a plurality of the particular type of data elements (e.g., scalar) described herein. A second example factor is that the data management system determines that a sequence of the plurality of element identifiers associated with the plurality of the particular type of data elements points to a sequence of consecutive instructions that are configured to be executed by the processor operating in the reactive mode. A third example factor is that the data management system determines that a range of memory locations, indicated by the sequence of consecutive instructions, fits within a preconfigured memory location associated with host memory.

In various embodiments, each data element within the data structure can include a tag. A tag can include an element identifier and a data type indicator associated with the data element. The data management system can determine a data type of the value of the data element based on the data type indicator associated with the data element. A data type indicator can indicate a data type of the value of the data element. An element identifier can be mapped to an instruction.

In various embodiments, a program counter associated with the processor is configured to point to a pointed-to instruction to maintain a state while the processor operates in the reactive mode.

Reference will now be made in detail to embodiments, embodiments of which are illustrated in the appended drawings. The present disclosure may, however, be embodied in many different forms and should not be construed as being limited to the embodiments set forth herein.

FIG. 1 is a block diagram showing an example data system 100 that includes a data management system (hereafter, the data management system 122, or system 122), according to various embodiments. As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the data management system 122 on the server system 108, it will be appreciated that the location of certain functionality within the server system 108 is a design choice. It can be technically preferable to initially deploy certain technology and functionality within the server system 108, but to later migrate this technology and functionality to the client software application 104 where the client device 102 provides various operations as described herein.

The server system 108 supports various services and operations that are provided to the client software application 104 by the data management system 122. Such operations include transmitting data from the data management system 122 to the client software application 104, receiving data from the client software application 104 to the system 122, and system 122 processing data generated by the client software application 104. Data exchanges within the data system 100 can be invoked and controlled through operations of software component environments available via one or more endpoints, or functions available via one or more user interfaces of the client software application 104, which can include web-based user interfaces provided by the server system 108 for presentation at the client device 102.

With respect to the server system 108, each of an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that can be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the data management system 122 of the application server 116.

The application server 116 hosts a number of applications and subsystems, including the data management system 122, which supports various functions and services with respect to various embodiments described herein.

The application server 116 is communicatively coupled to a database server 118, which facilitates access to database 120, which stores data associated with the data management system 122.

Figure 2:
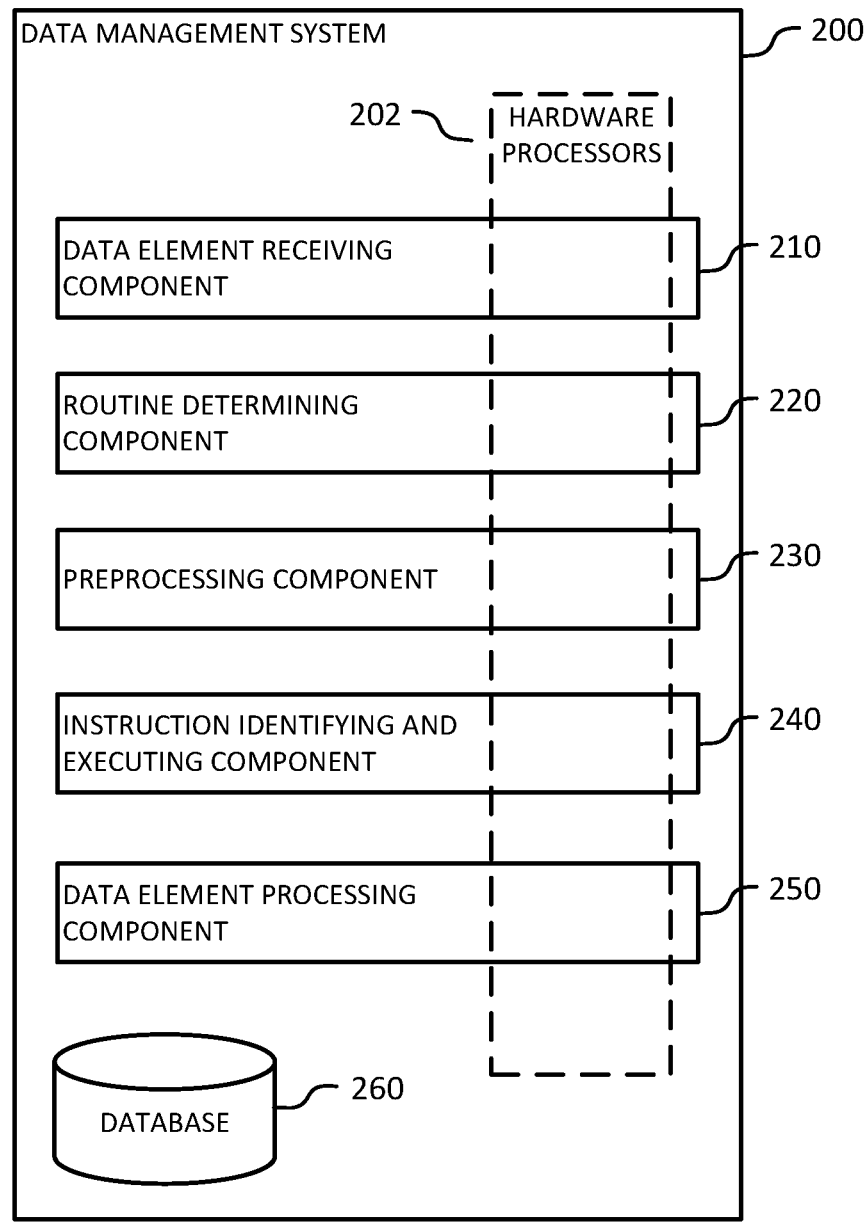
FIG. 2 is a block diagram illustrating an example data management system, according to various embodiments.

FIG. 2 is a block diagram illustrating an example data management system 200, according to various embodiments. For some embodiments, the data management system 200 represents an example of the data management system 122 described with respect to FIG. 1. As shown, the data management system 200 comprises a data element receiving component 210, a routine determining component 220, a preprocessing component 230, an instruction identifying and executing component 240, and a data element processing component 250. According to various embodiments, one or more of the data element receiving component 210, the routine determining component 220, the preprocessing component 230, the instruction identifying and executing component 240, and the data element processing component 250 are implemented by one or more hardware processors 202. Data generated by one or more of the data element receiving component 210, the routine determining component 220, the preprocessing component 230, the instruction identifying and executing component 240, and the data element processing component 250 may be stored in a database (or datastore) 260 of the data management system 200.

The data element receiving component 210 is configured to receive a data structure that includes one or more elements (also referred to as data elements or variables). Each element can include a tag and a value of the element. The data structure can be represented by or included in a received byte string.

The routine determining component 220 is configured to determine that processing the byte string (or the data structure) requires a routine or program handled by a processor capable of operating in a proactive and/or reactive mode.

The preprocessing component 230 is configured to determine, based on the tag (or individual components thereof), that the value corresponds to a particular type of value, such as a scalar type, or equivalent data types associated with simple data structures. The preprocessing component 230 is further configured to determine that one or more element identifiers are mapped to one or more instructions for execution.

The instruction identifying and executing component 240 is configured to identify and execute, by the processor operating in the reactive mode, an instruction that causes the processor to remain in the reactive mode of operation. The instruction that causes the processor to remain in the reactive mode includes an indication of a memory location where the value is to be stored.

The data element processing component 250 is configured to process the one or more data elements by the processor operating in the reactive mode.

Figure 3:
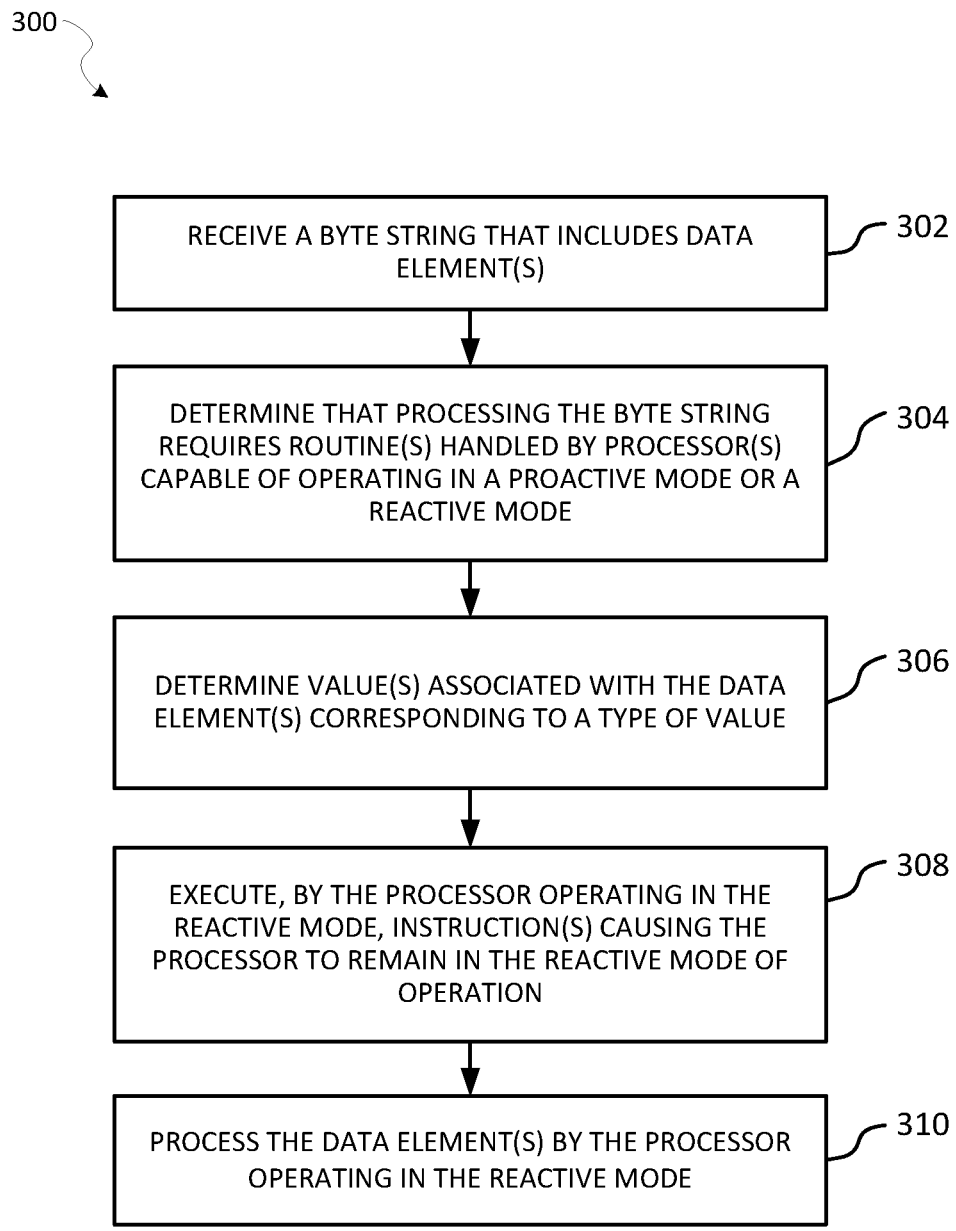
FIG. 3 is a flowchart illustrating an example method for facilitating reactive code execution, according to various embodiments.

FIG. 3 is a flowchart illustrating an example method 300 for facilitating reactive code execution, according to various embodiments. It will be understood that methods described herein can be performed by a machine in accordance with some embodiments. For example, method 300 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 300 may be represented by executable instructions that, when executed by a processor of a computing device, cause the computing device to perform method 300. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 302, a processor receives a data structure that includes one or more elements. Each element can include a tag and a value of the element. The data structure can be represented by or included in a received byte string.

At operation 304, a processor determines that processing the byte string (or the data structure) requires a routine or program handled by a processor capable of operating in a proactive and/or reactive mode.

At operation 306, a processor determines, based on the tag (or individual components thereof), that the value corresponds to a particular type of value, such as a scalar type, or equivalent data types associated with simple data structures.

At operation 308, a processor executes, by the processor operating in the reactive mode, an instruction that causes the processor to remain in the reactive mode of operation. The instruction that causes the processor to remain in the reactive mode includes an indication of a memory location where the value is to be stored.

At operation 310, a processor processes the element in a reactive mode.

Though not illustrated, method 300 can include an operation where a graphical user interface for managing data can be displayed (or caused to be displayed) by the hardware processor. For instance, the operation can cause a computing device to display the graphical user interface for facilitating reactive code execution. This operation for displaying the graphical user interface can be separate from operations 302 through 310 or, alternatively, form part of one or more of operations 302 through 310.

Figure 4:
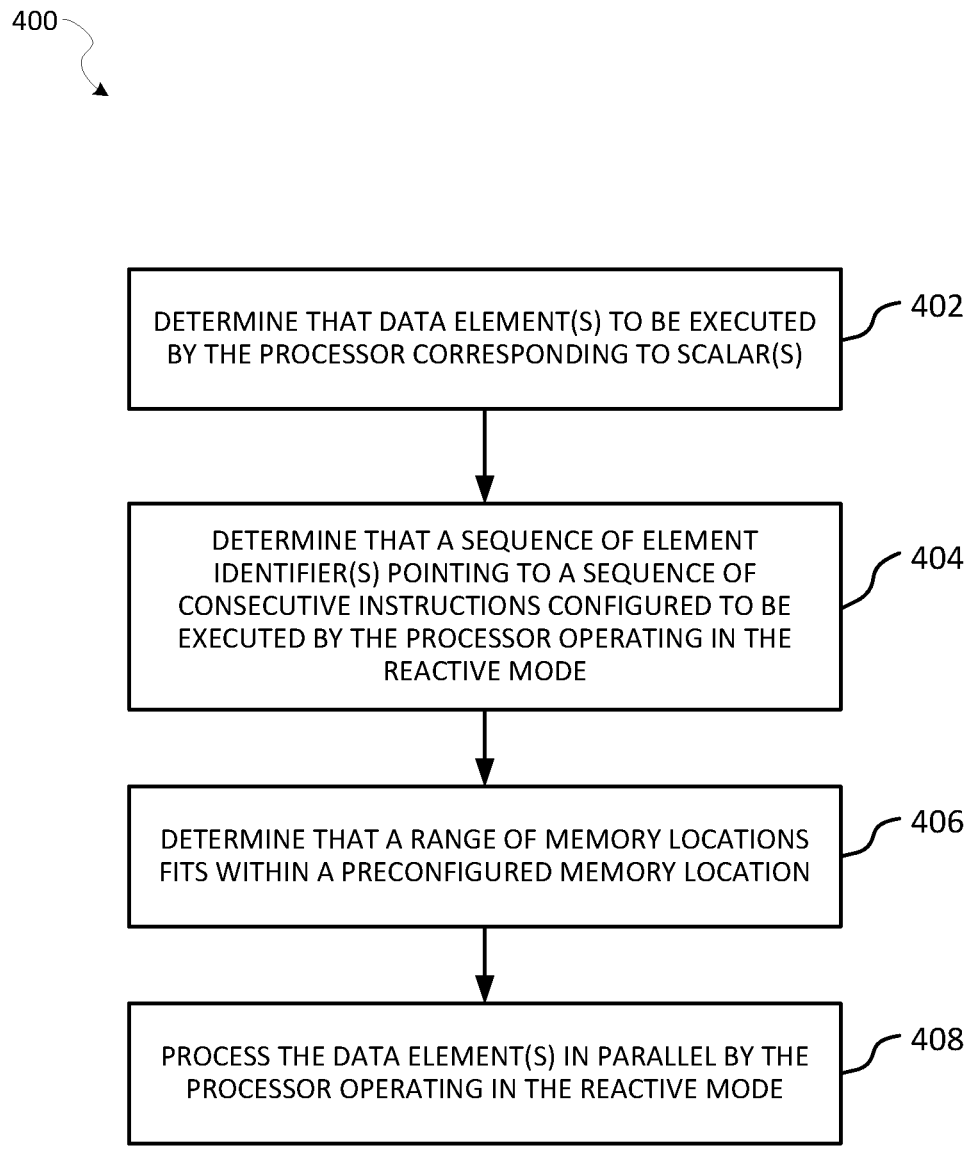
FIG. 4 is a flowchart illustrating an example method for facilitating reactive code execution, according to various embodiments.

FIG. 4 is a flowchart illustrating an example method for facilitating reactive code execution, according to various embodiments. It will be understood that methods described herein can be performed by a machine in accordance with some embodiments. For example, method 400 can be performed by the data management system 122 described with respect to FIG. 1, the data management system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, a processor determines that a value of a data element corresponds to a particular type of value, such as a scalar type, or equivalent data types associated with simple data structures.

At operation 404, a processor determines that a sequence of the plurality of element identifiers associated with the plurality of the particular type of data elements points to a sequence of consecutive instructions that are configured to be executed by the processor operating in the reactive mode.

At operation 406, a processor determines that a range of memory locations, indicated by the sequence of consecutive instructions, fits within a preconfigured memory location associated with host memory.

At operation 408, a processor operating in the reactive mode processes a plurality of data elements in parallel based on one or more factors described herein.

Though not illustrated, method 400 can include an operation where a graphical user interface for managing data can be displayed (or caused to be displayed) by the hardware processor. For instance, the operation can cause a computing device to display the graphical user interface for facilitating reactive code execution. This operation for displaying the graphical user interface can be separate from operations 402 through 408 or, alternatively, form part of one or more of operations 402 through 408.

Figure 5:
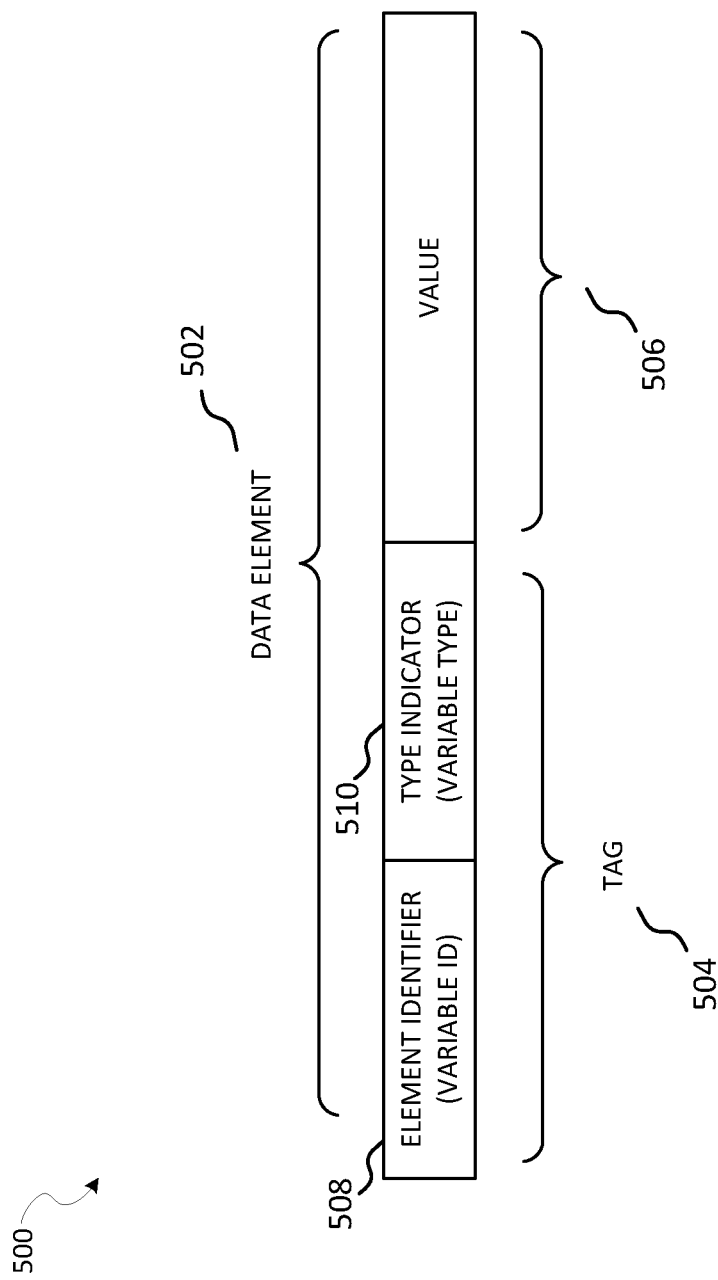
FIG. 5 is a diagram illustrating an example data element, according to various embodiments.

FIG. 5 is a diagram 500 illustrating an example data element, according to various embodiments. As shown, an example data element 502 includes a tag 504 and a value 506. The tag 504 includes an element identifier 508 and a type indicator 510. The element identifier 508 can be mapped by software to a set of parameters that instruct the software to store the extracted value in memory, A tag can be shared by multiple data elements.

In the reactive mode, in various embodiments, the element identifier 508 can be used to override a value in the program counter. This way, a processor operating in the reactive mode can fetch, based on the element identifier 508, one or more instructions directly in order to process the data element 502.

Figure 6:
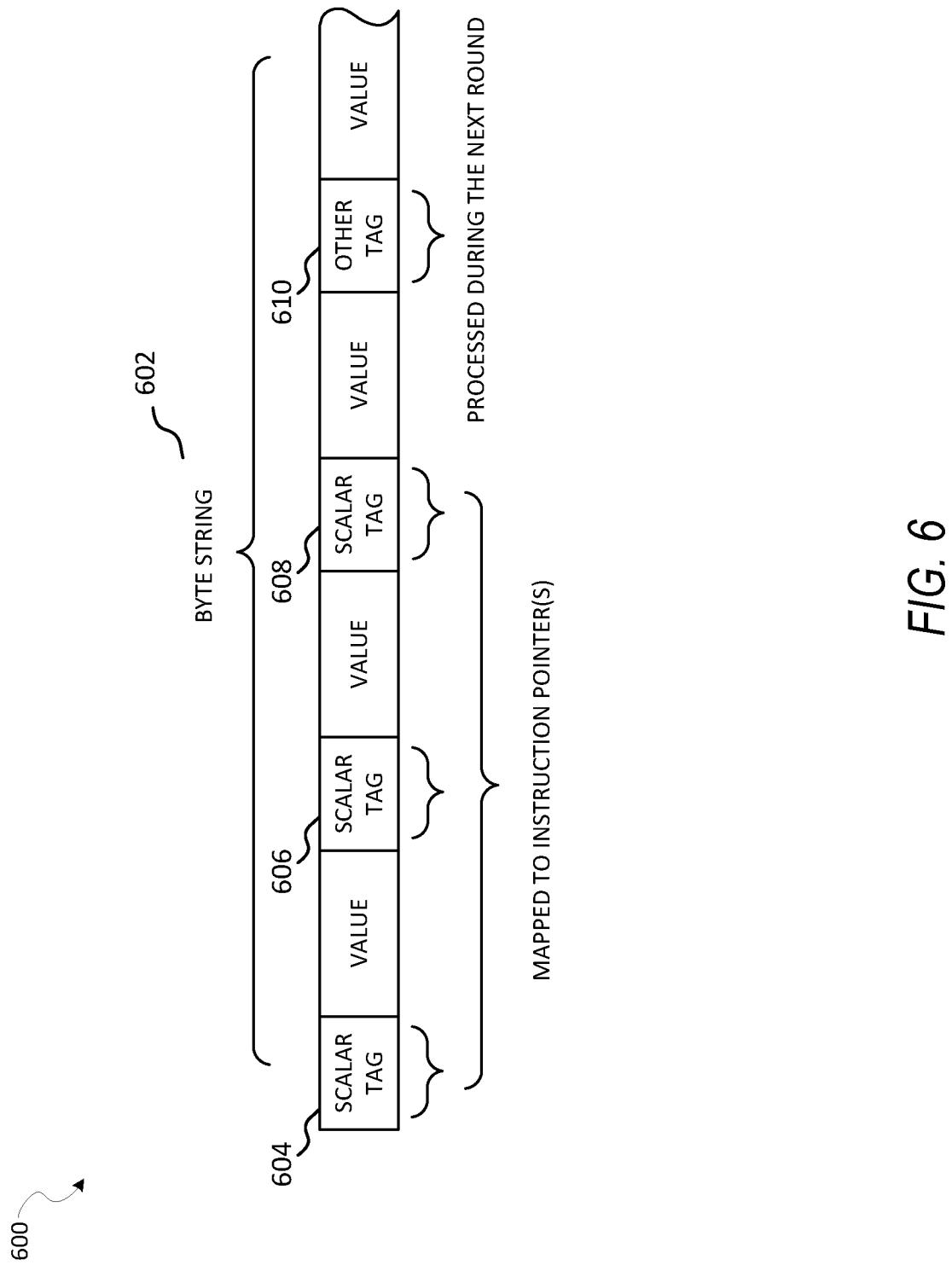
FIG. 6 is a diagram illustrating an example data flow in an example data management system during operation, according to various embodiments.

FIG. 6 is a block diagram 600 illustrating an example data flow in an example data management system during operation, according to various embodiments. As shown, an example byte string 602 includes a plurality of elements. Each element includes a tag and a value. Tags (e.g., tags 604, 606, 608) of the same type (e.g., scalar) can be mapped to an instruction pointer.

In support of the reactive mode of operation, the preprocessing logic (or the preprocessing component 230 as illustrated in FIG. 2) is configured to parse the tags (e.g., tags 604, 606, 608, 610) of a number of data elements (or variables) as they are received. The parsing includes examining a data element's type to determine whether or not a data element is a scalar and to extract the associated element identifier value.

The extracted element identifier values (e.g., variableId values) are mapped to instruction pointer values using the value held in the processor's variableIdBase register. The extracted variableId values are also bounds checked using the value in the processor's variableIdLimit register. The instruction pointer and variable type values are then delivered in parallel to the processor's core to initiate instruction fetch(es).

If a variableId value extracted from the received packet exceeds the limit imposed by the variableIdLimit register, then the variableId is clipped to that limit and allowed to proceed. The purpose of this is to support unknown variableId values. When an unknown variableId value is received, it must be mapped to an instruction that branches to code that is intended to handle unknown variableId values (typically by skipping over the bytes associated with the variable).

The number of variables that are examined can be limited to a small working buffer that feeds into the preprocessor (also referred to as preprocessing logic). The preprocessor extracts no more than four variableId/variableType pairs per operation. This limit is imposed by the maximum number of scalar values that can be stored in a 128-bit word when tagged variables are being used. The second limit imposed on the number of instructionPointer/variableType pairs that are delivered in a single operation is encountering a non-scalar variable (as indicated by the variableType value in the variable's tag). Non-scalar variable types can include arrays and embedded messages.

If the first (i.e., leftmost) variable is a non-scalar value, then only that first variable's variableId-derived instructionPointer value and variableType value are delivered to the processor's core. If the first variable is an individual scalar value, then further variables may also be included in the batch of data provided to the processor's core. If a non-scalar variable is encountered, then only the scalars that preceded that non-scalar are processed. Under this approach, the non-scalar variable is the first and only variable consumed in the next round of processing.

In various embodiments, scalar variables (e.g., data elements that correspond to scalars) identified and parsed by the preprocessing logic can be processed in parallel by the processor (or by the processor's core). All of the candidate scalar variables for parallel processing can be configured at a fixed-bit word in a buffer.

Figure 7:
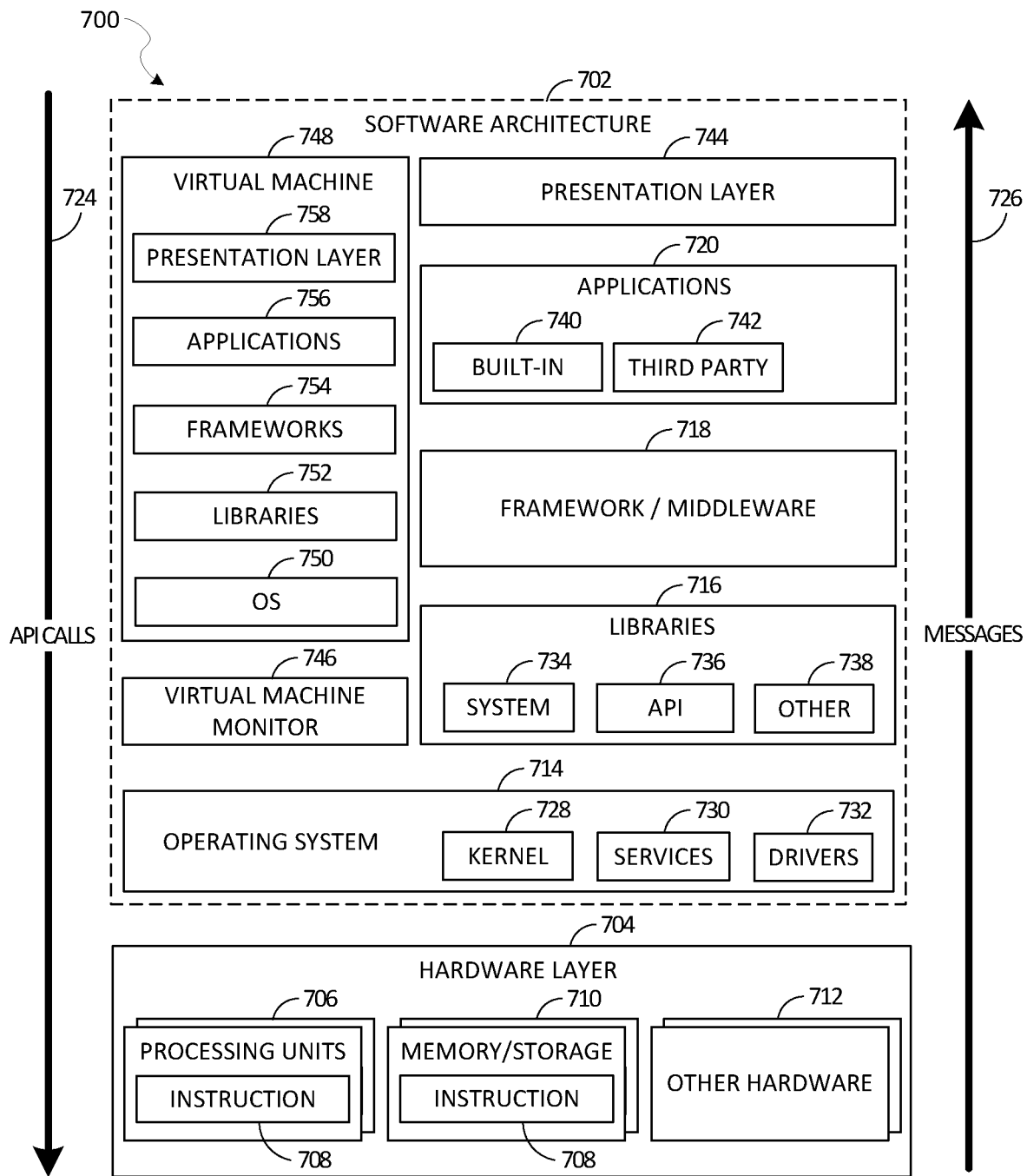
FIG. 7 is a block diagram illustrating a representative software architecture, which can be used in conjunction with various hardware architectures herein described, according to various embodiments.

FIG. 7 is a block diagram illustrating an example of a software architecture 702 that can be installed on a machine, according to some embodiments. FIG. 7 is merely a non-limiting embodiment of a software architecture, and it will be appreciated that many other architectures can be implemented to facilitate the functionality described herein. The software architecture 702 can be executing on hardware such as a machine 800 of FIG. 8 that includes, among other things, processors 810, memory 830, and input/output (I/O) components 850. A representative hardware layer 704 is illustrated and can represent, for embodiment, the machine 800 of FIG. 8. The representative hardware layer 704 comprises one or more processing units 706 having associated executable instructions 708. The executable instructions 708 represent the executable instructions of the software architecture 702. The hardware layer 704 also includes memory or storage modules 710, which also have the executable instructions 708. The hardware layer 704 can also comprise other hardware 712, which represents any other hardware of the hardware layer 704, such as the other hardware illustrated as part of the machine 800.

In the embodiment architecture of FIG. 7, the software architecture 702 can be conceptualized as a stack of layers, where each layer provides particular functionality. For embodiment, the software architecture 702 can include layers such as an operating system 714, libraries 716, frameworks/middleware 718, applications 720, and a presentation layer 744. Operationally, the applications 720 or other components within the layers can invoke API calls 724 through the software stack and receive a response, returned values, and so forth (illustrated as messages 726) in response to the API calls 724. The layers illustrated are representative in nature, and not all software architectures have all layers. For embodiment, some mobile or special-purpose operating systems cannot provide a frameworks/middleware 718 layer, while others can provide such a layer. Other software architectures can include additional or different layers.

The operating system 714 can manage hardware resources and provide common services. The operating system 714 can include, for embodiment, a kernel 728, services 730, and drivers 732. The kernel 728 can act as an abstraction layer between the hardware and the other software layers. For embodiment, the kernel 728 can be responsible for memory management, processor management (e.g., scheduling), component management, networking, security settings, and so on. The services 730 can provide other common services for the other software layers. The drivers 732 can be responsible for controlling or interfacing with the underlying hardware. For instance, the drivers 732 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 can provide a common infrastructure that can be utilized by the applications 720 and/or other components and/or layers. The libraries 716 typically provide functionality that allows other software modules to perform tasks in an easier fashion than by interfacing directly with the underlying operating system 714 functionality (e.g., kernel 728, services 730, or drivers 732). The libraries 716 can include system libraries 734 (e.g., C standard library) that can provide functions such as memory allocation functions, string manipulation functions, mathematic functions, and the like. In addition, the libraries 716 can include API libraries 736 such as media libraries (e.g., libraries to support presentation and manipulation of various media formats such as MPEG4, H.264, MP3, AAC, AMR, JPG, and PNG), graphics libraries (e.g., an OpenGL framework that can be used to render 2D and 3D graphic content on a display), database libraries (e.g., SQLite that can provide various relational database functions), web libraries (e.g., WebKit that can provide web browsing functionality), and the like. The libraries 716 can also include a wide variety of other libraries 738 to provide many other APIs to the applications 720 and other software components/modules.

The frameworks 718 (also sometimes referred to as middleware) can provide a higher-level common infrastructure that can be utilized by the applications 720 or other software components/modules. For embodiment, the frameworks 718 can provide various graphical user interface functions, high-level resource management, high-level location services, and so forth. The frameworks 718 can provide a broad spectrum of other APIs that can be utilized by the applications 720 and/or other software components/modules, some of which can be specific to a particular operating system or platform.

The applications 720 include built-in applications 740 and/or third-party applications 742. Embodiments of representative built-in applications 740 can include, but are not limited to, a home application, a contacts application, a browser application, a book reader application, a location application, a media application, a messaging application, or a game application.

The third-party applications 742 can include any of the built-in applications 740, as well as a broad assortment of other applications. In a specific embodiment, the third-party applications 742 (e.g., an application developed using the Android™ or iOS™ software development kit (SDK) by an entity other than the vendor of the particular platform) can be mobile software running on a mobile operating system such as iOS™, Android™, or other mobile operating systems. In this embodiment, the third-party applications 742 can invoke the API calls 724 provided by the mobile operating system such as the operating system 714 to facilitate functionality described herein.

The applications 720 can utilize built-in operating system functions (e.g., kernel 728, services 730, or drivers 732), libraries (e.g., system libraries 734, API libraries 736, and other libraries 738), or frameworks/middleware 718 to create user interfaces to interact with users of the system. Alternatively, or additionally, in some systems, interactions with a user can occur through a presentation layer, such as the presentation layer 744. In these systems, the application/module "logic" can be separated from the aspects of the application/module that interact with the user.

Some software architectures utilize virtual machines. In the embodiment of FIG. 7, this is illustrated by a virtual machine 748. The virtual machine 748 creates a software environment where applications/modules can execute as if they were executing on a hardware machine (e.g., the machine 800 of FIG. 8). The virtual machine 748 is hosted by a host operating system (e.g., the operating system 714) and typically, although not always, has a virtual machine monitor 746, which manages the operation of the virtual machine 748 as well as the interface with the host operating system (e.g., the operating system 714). A software architecture executes within the virtual machine 748, such as an operating system 750, libraries 752, frameworks/middleware 754, applications 756, or a presentation layer 758.

These layers of software architecture executing within the virtual machine 748 can be the same as corresponding layers previously described or can be different.

Figure 8:
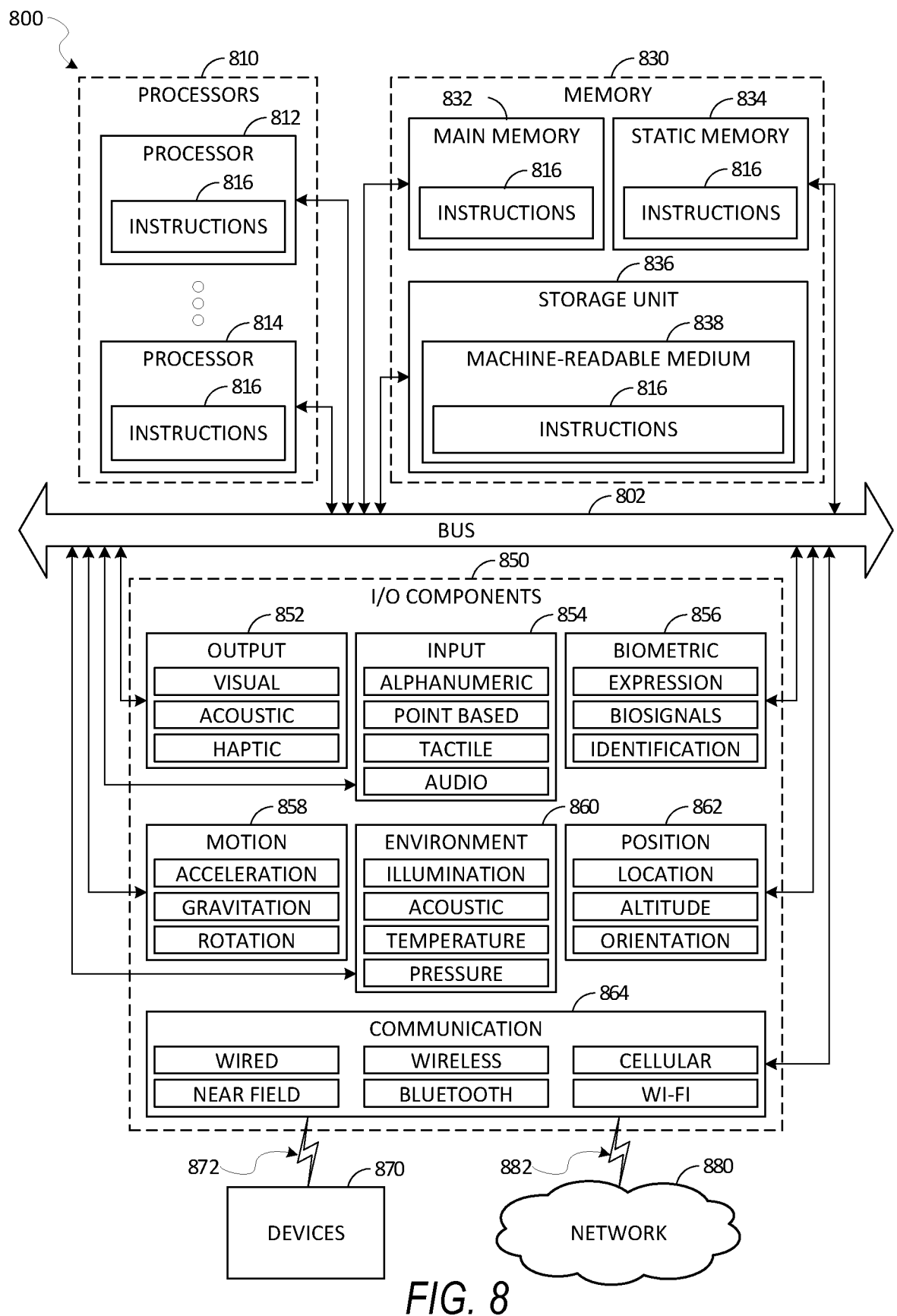
FIG. 8 is a block diagram illustrating components of a machine able to read instructions from a machine storage medium and perform any one or more of the methodologies discussed herein according to various embodiments.

FIG. 8 illustrates a diagrammatic representation of a machine 800 in the form of a computer system within which a set of instructions can be executed for causing the machine 800 to perform any one or more of the methodologies discussed herein, according to an embodiment. Specifically, FIG. 8 shows a diagrammatic representation of the machine 800 in the embodiment form of a computer system, within which instructions 816 (e.g., software, a program, an application, an applet, an app, or other executable code) for causing the machine 800 to perform any one or more of the methodologies discussed herein can be executed. For embodiment, the instructions 816 can cause the machine 800 to execute the method 300 described above with respect to FIG. 3, and the method 400 described above with respect to FIG. 4. The instructions 816 transform the general, non-programmed machine 800 into a particular machine 800 programmed to carry out the described and illustrated functions in the manner described. In some embodiments, the machine 800 operates as a standalone device or can be coupled (e.g., networked) to other machines. In a networked deployment, the machine 800 can operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 can include processors 810, memory 830, and I/O components 850, which can be configured to communicate with each other such as via a bus 802. In an embodiment, the processors 810 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) can include, for embodiment, a processor 812 and a processor 814 that can execute the instructions 816. The term "processor" is intended to include multi-core processors that can comprise two or more independent processors (sometimes referred to as "cores") that can execute instructions contemporaneously. Although FIG. 8 shows multiple processors 810, the machine 800 can include a single processor with a single core, a single processor with multiple cores (e.g., a multi-core processor), multiple processors with a single core, multiple processors with multiples cores, or any combination thereof.

The memory 830 can include a main memory 832, a static memory 834, and a storage unit 836 including machine-readable medium 838, each accessible to the processors 810 such as via the bus 802. The main memory 832, the static memory 834, and the storage unit 836 store the instructions 816 embodying any one or more of the methodologies or functions described herein. The instructions 816 can also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 can include a wide variety of components to receive input, provide output, produce output, transmit information, exchange information, capture measurements, and so on. The specific I/O components 850 that are included in a particular machine will depend on the type of machine. For embodiment, portable machines such as mobile phones will likely include a touch input device or other such input mechanisms, while a headless server machine will likely not include such a touch input device. It will be appreciated that the I/O components 850 can include many other components that are not shown in FIG. 8. The I/O components 850 are grouped according to functionality merely for simplifying the following discussion, and the grouping is in no way limiting. In various embodiments, the I/O components 850 can include output components 852 and input components 854. The output components 852 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 850 can include biometric components 856, motion components 858, environmental components 860, or position components 862, among a wide array of other components. The motion components 858 can include acceleration sensor components (e.g., accelerometer), gravitation sensor components, rotation sensor components (e.g., gyroscope), and so forth. The environmental components 860 can include, for embodiment, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 862 can include location sensor components (e.g., a Global Positioning System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 850 can include communication components 864 operable to couple the machine 800 to a network 880 or devices 870 via a coupling 882 and a coupling 872, respectively. For embodiment, the communication components 864 can include a network interface component or another suitable device to interface with the network 880. In further embodiments, the communication components 864 can include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 can be another machine or any of a wide variety of peripheral devices (e.g., a peripheral device coupled via a USB).

Moreover, the communication components 864 can detect identifiers or include components operable to detect identifiers. For embodiment, the communication components 864 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 864, such as location via Internet Protocol (IP) geolocation, location via Wi-Fi® signal triangulation, location via detecting an NFC beacon signal that can indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In various embodiments, a hardware module is implemented mechanically, electronically, or any suitable combination thereof. For embodiment, a hardware module can include dedicated circuitry or logic that is permanently configured to perform certain operations. For embodiment, a hardware module can be a special-purpose processor, such as a field-programmable gate array (FPGA) or an ASIC. A hardware module can also include programmable logic or circuitry that is temporarily configured by software to perform certain operations. For embodiment, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. In various embodiments, where a hardware module includes a general-purpose processor configured by software to become a special-purpose processor, the general-purpose processor can be configured as respectively different special-purpose processors (e.g., comprising different hardware modules) at different times. Software can accordingly configure a particular processor or processors, for embodiment, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules can be achieved, for embodiment, through the storage and retrieval of information in memory structures to which the multiple hardware modules have access. For embodiment, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of embodiment methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For embodiment, at least some of the operations of a method can be performed by one or more processors or processor-implemented modules. Moreover, the one or more processors can also operate to support performance of the relevant operations in a "cloud computing" environment or as a "software as a service" (SaaS). For embodiment, at least some of the operations can be performed by a group of computers (as embodiments of machines 800 including processors 810), with these operations being accessible via a network (e.g., the Internet) and via one or more appropriate interfaces (e.g., an API). In certain embodiments, for embodiment, a client device can relay or operate in communication with cloud computing systems and can access circuit design information in a cloud environment.

The performance of certain of the operations can be distributed among the processors, not only residing within a single machine 800, but deployed across a number of machines 800. In some embodiment embodiments, the processors 810 or processor-implemented modules are located in a single geographic location (e.g., within a home environment, an office environment, or a server farm). In other embodiments, the processors or processor-implemented modules are distributed across a number of geographic locations.

Executable Instructions and Machine Storage Medium

The various memories (i.e., 830, 832, 834, and/or the memory of the processor(s) 810) and/or the storage unit 836 can store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and can be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to processors. Specific embodiments of machine-storage media, computer-storage media and/or device-storage media include non-volatile memory, including by way of embodiment semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 880 can be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For embodiment, the network 880 or a portion of the network 880 can include a wireless or cellular network, and the coupling 882 can be a Code Division Multiple Access (CDMA) connection, a Global System for Mobile communications (GSM) connection, or another type of cellular or wireless coupling. In this embodiment, the coupling 882 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions can be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions can be transmitted or received using a transmission medium via the coupling (e.g., a peer-to-peer coupling) to the devices 870. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances can implement resources, components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in embodiment configurations can be implemented as a combined structure or component. Similarly, structures and functionality presented as a single component can be implemented as separate components.

As used herein, the term "or" can be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases can be absent. Additionally, boundaries between various resources, operations, modules, engines, and data stores are somewhat arbitrary, and particular operations are illustrated in a context of specific illustrative configurations. Other allocations of functionality are envisioned and can fall within a scope of various embodiments. The specification and drawings are, accordingly, to be regarded in an illustrative rather than a restrictive sense.

It will be understood that changes and modifications can be made to the disclosed embodiments without departing from the scope of the present disclosure. These and other changes or modifications are intended to be included within the scope of the present disclosure.

What is claimed is:

1. A method comprising:
receiving a byte string that includes a data structure, the data structure comprising an element that includes a tag and a value;
determining that processing the byte string requires a routine that is handled by a processor capable of operating in a proactive mode or a reactive mode;
determining, based on the tag, that the value corresponds to a type of value;
executing, by the processor operating in the reactive mode, an instruction that causes the processor to remain in the reactive mode of operation; and
processing the element by the processor operating in the reactive mode.

2. The method of claim 1, wherein the instruction comprises an indication of a memory location where the value is to be stored.

3. The method of claim 1, wherein the element being a first element, the tag being a first tag, the value being a first value, the data structure comprising a plurality of elements that includes the first element and a second element, the second element comprising a second tag and a second value, further comprising:
determining, based on the second tag, that the second value corresponds to the type of value; and
processing the second element including causing the processor to continue operating in the reactive mode to execute the instruction.

4. The method of claim 1, further comprising:
determining that a next element to be executed by the processor does not correspond to the type of value; and
causing the processor to revert back to the proactive mode of operation.

5. The method of claim 1, further comprising:
determining that a next plurality of elements to be executed by the processor corresponds to a plurality of tagged scalars; and
processing the next plurality of elements in parallel by the processor operating in the reactive mode.

6. The method of claim 5, wherein the next plurality of elements comprises a plurality of tags that comprises a plurality of data type indicators and a plurality of element identifiers, and wherein the next plurality of elements to be executed by the processor comprises values corresponding to the type of value that is determined based on the plurality of data type indicators.

7. The method of claim 6, further comprising:
determining that a sequence of the plurality of element identifiers pointing to a sequence of consecutive instructions that are configured to be executed by the processor operating in the reactive mode; and
determining that a range of memory locations, indicated by the sequence of consecutive instructions, fits within a preconfigured memory location associated with host memory.

8. The method of claim 1, wherein the tag comprises a data type indicator and an element identifier, the data type indicator indicating a data type of the value, the element identifier being mapped to the instruction.

9. The method of claim 1, wherein a program counter associated with the processor is configured to point to a pointed-to instruction to maintain a state while the processor operates in the reactive mode, and wherein the processor operates in the proactive mode at initialization.

10. The method of claim 1, wherein the execution of the instruction causes the processor to operate in the reactive mode, and wherein the type of value corresponds to scalars.

11. A system comprising:
a memory storing instructions; and
one or more hardware processors communicatively coupled to the memory and configured by the instructions to perform operations comprising:
receiving a byte string that includes a data structure, the data structure comprising an element that includes a tag and a value;
determining that processing the byte string requires a routine that is handled by a processor capable of operating in a proactive mode or a reactive mode;
determining, based on the tag, that the value corresponds to a type of value;
executing, by the processor operating in the reactive mode, an instruction that causes the processor to remain in the reactive mode of operation; and
processing the element by the processor operating in the reactive mode.

12. The system of claim 11, wherein the instruction comprises an indication of a memory location where the value is to be stored.

13. The system of claim 11, wherein the element being a first element, the tag being a first tag, the value being a first value, the data structure comprising a plurality of elements that includes the first element and a second element, the second element comprising a second tag and a second value, wherein the operations further comprise:
determining, based on the second tag, that the second value corresponds to the type of value; and
processing the second element including causing the processor to continue operating in the reactive mode to execute the instruction.

14. The system of claim 11, wherein the operations further comprise:
determining that a next element to be executed by the processor does not correspond to the type of value; and
causing the processor to revert back to the proactive mode of operation.

15. The system of claim 11, wherein the operations further comprise:
determining that a next plurality of elements to be executed by the processor corresponds to a plurality of tagged scalars; and
processing the next plurality of elements in parallel by the processor operating in the reactive mode.

16. The system of claim 15, wherein the next plurality of elements comprises a plurality of tags that comprises a plurality of data type indicators and a plurality of element identifiers, and wherein the next plurality of elements to be executed by the processor comprises values corresponding to the type of value that is determined based on the plurality of data type indicators.

17. The system of claim 16, wherein the operations further comprise:
determining that a sequence of the plurality of element identifiers pointing to a sequence of consecutive instructions that are configured to be executed by the processor operating in the reactive mode; and
determining that a range of memory locations, indicated by the sequence of consecutive instructions, fits within a preconfigured memory location associated with host memory.

18. The system of claim 11, wherein the tag comprises a data type indicator and an element identifier, the data type indicator indicating a data type of the value, the element identifier being mapped to the instruction.

19. The system of claim 11, wherein a program counter associated with the processor is configured to point to a pointed-to instruction to maintain a state while the processor operates in the reactive mode, and wherein the processor operates in the proactive mode at initialization.

20. A non-transitory computer-readable medium comprising instructions that, when executed by a hardware processor of a device, cause the device to perform operations comprising:
  receiving a byte string that includes a data structure, the data structure comprising an element that includes a tag and a value;
  determining that processing the byte string requires a routine that is handled by a processor capable of operating in a proactive mode or a reactive mode;
  determining, based on the tag, that the value corresponds to a type of value;
  executing, by the processor operating in the reactive mode, an instruction that causes the processor to remain in the reactive mode of operation; and
  processing the element by the processor operating in the reactive mode.

* * * * *